Figure 5:
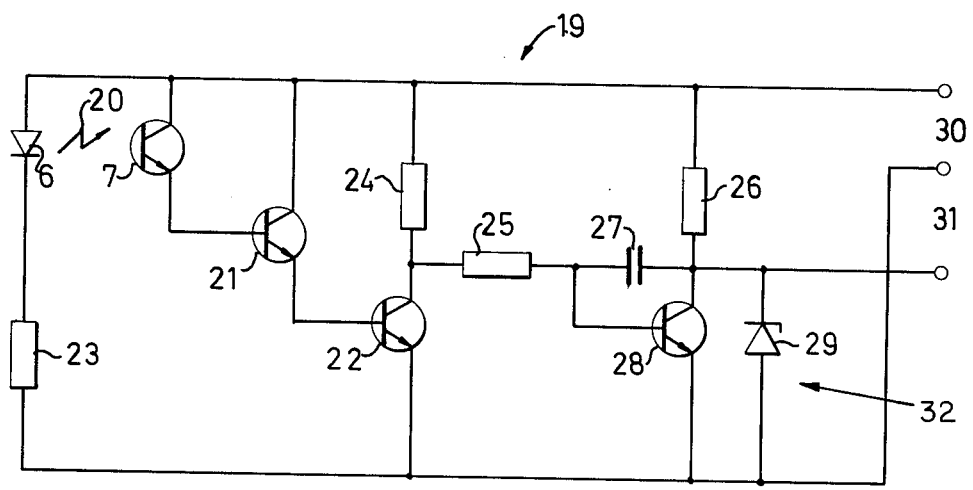

United States Patent [19]

Bergkvist

[11] 4,172,994

[45] Oct. 30, 1979

[54] ELECTRO-OPTIC APPARATUS FOR MEASURING THE SPEED OF ANGULAR ROTATION OF ONE BODY RELATIVE ANOTHER USING MOIRE PATTERNS

[76] Inventor: Lars A. Bergkvist, Gottne, 890 42 Mellansel, Sweden

[21] Appl. No.: 840,850

[22] Filed: Oct. 11, 1977

[30] Foreign Application Priority Data

Oct. 15, 1976 [SE] Sweden .................. 7611510

[51] Int. Cl.² .......................... G01P 3/36; G01C 9/06
[52] U.S. Cl. .................... 324/175; 250/237 G; 356/374; 356/138
[58] Field of Search .............. 324/166, 175; 356/169; 250/237 G, 231 SE; 33/366

[56] References Cited

U.S. PATENT DOCUMENTS

| | | | |
|---|---|---|---|
| 2,390,122 | 12/1945 | Powers | 356/169 |
| 3,175,093 | 3/1965 | De Lang | 250/237 G |
| 3,553,469 | 1/1971 | Stutz et al. | 250/231 SE |
| 3,657,551 | 4/1972 | Lingert et al. | 33/366 |
| 3,693,023 | 9/1972 | Wasserman | 324/175 |

*Primary Examiner*—Rudolph V. Rolinec
*Assistant Examiner*—Walter E. Snow
*Attorney, Agent, or Firm*—Silverman, Cass & Singer, Ltd.

[57] ABSTRACT

Apparatus for measuring the speed of rotation of a wheel or the angular orientation thereof relative to a fixed point. A first portion of a transmitter unit is positioned along the periphery of the wheel and a second portion of the transmitter unit is positioned at a stationary location outside of the wheel. The two portions of the transmitter unit together from one or more lined screens which, when one is viewed through the other, create a moire interference pattern. Optical means are provided to read the interference pattern created as the wheel is moved to thereby determine the speed or angular orientation thereof.

8 Claims, 7 Drawing Figures

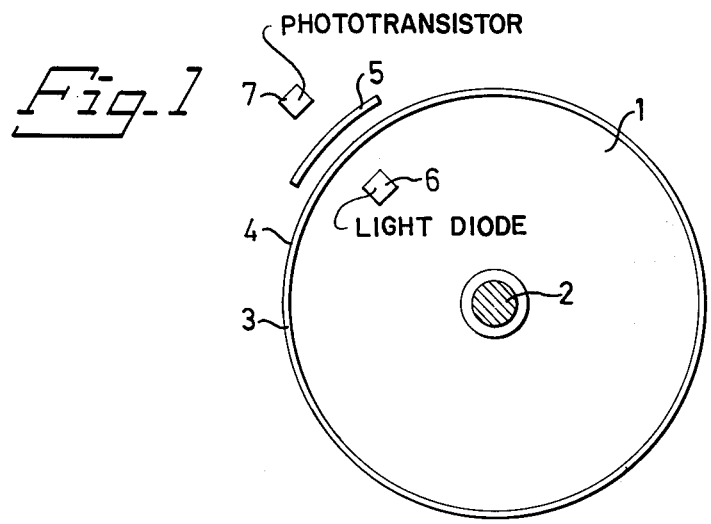
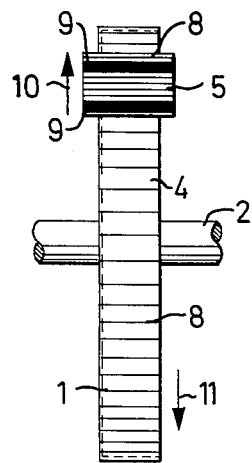
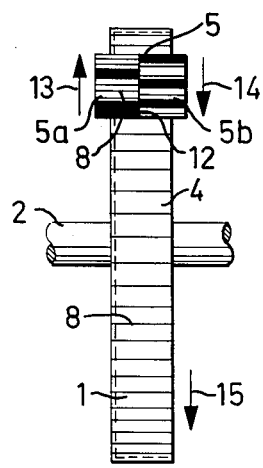
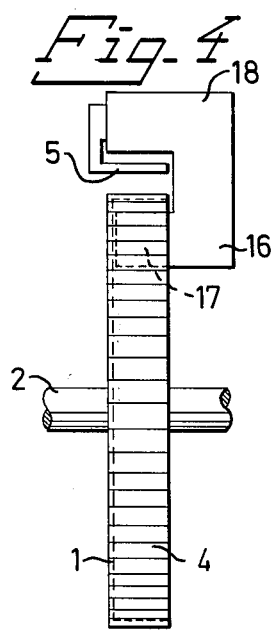

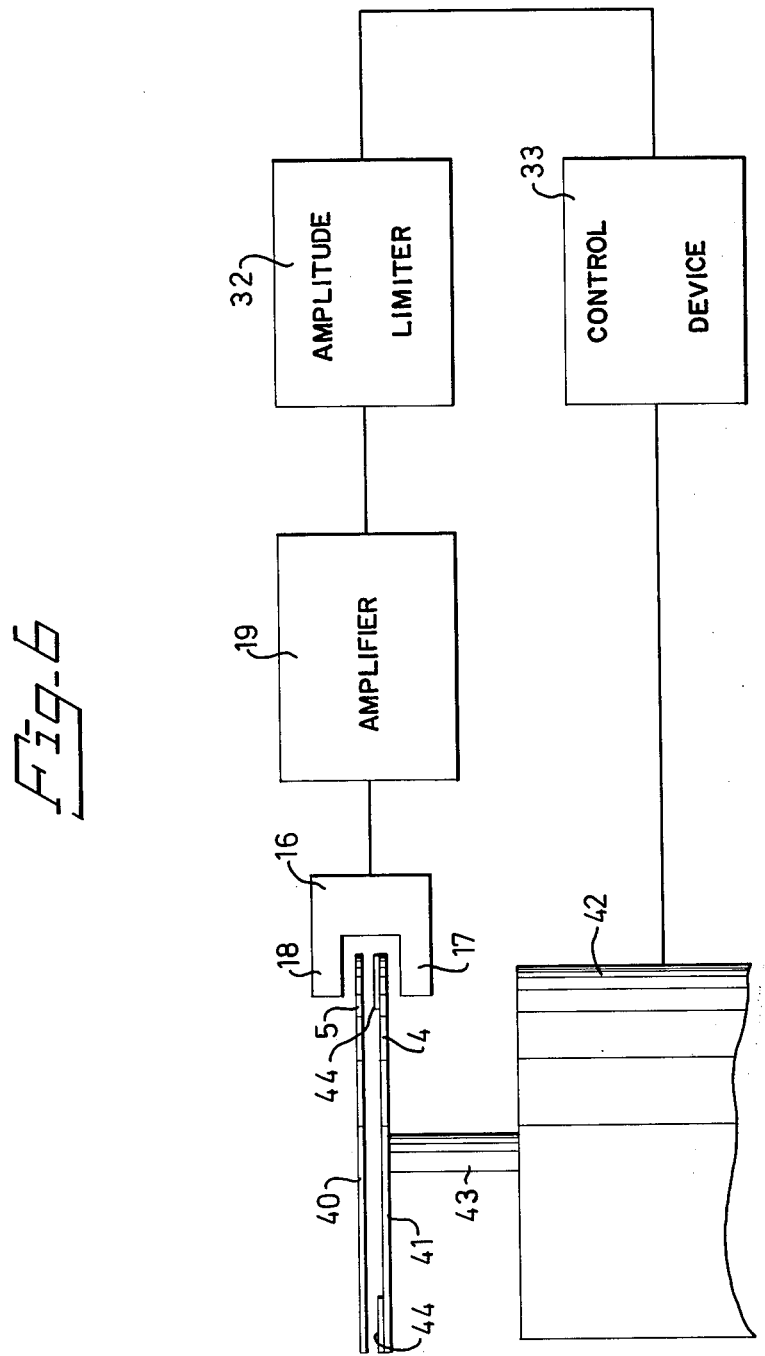

ELECTRO-OPTIC APPARATUS FOR MEASURING THE SPEED OF ANGULAR ROTATION OF ONE BODY RELATIVE ANOTHER USING MOIRE PATTERNS

This invention relates to an angle indication device or tachometer where the angular position or angular speed is recorded electronically.

Known devices for measuring angles or angular speeds in an electronic way often use a metallic wheel with slotted periphery, at which the metallic slots magnetically give rise to electric pulses via an electromagnetic member, or a wheel, the periphery of which is provided with magnetized portions uniformly distributed over the periphery and with non-magnetized interspaces, where upon rotation of the wheel electric pulses are generated in an electromagnetic means.

The known devices render it possible to obtain with respect to the angular position of the wheel a greatest solution, which corresponds to the division of magnetized and non-magnetized portion along the periphery of the wheel, alternatively to the number of slots in a slotted wheel. The division of course also effects the accuracy with which the angular speed of a wheel can be determined. There exist also wheels, which are slotted along their periphery and where upon rotation of the wheel pulses are generated in an optical way. The above information concerning division applies also to these devices.

The present invention has the object of producing a device, at which with respect, for example, to the angular position or angular speed of a wheel a substantially higher accuracy is obtained.

The present invention relates to a device for indicating an angle or an angular speed and comprises a circular unit, such as a wheel, which is turned through said angle or rotates at said angular speed, a first portion of a transmitter unit being located at the periphery of the wheel and a second portion of a transmitter unit stationary attached outside the wheel, said first and said second portion of the transmitter unit comprising one or more screens consisting of opaque lines separated by light or transparent lines, said two portions being capable during the measuring to perform a movement relative to each other, so that each opaque line on one of the two portions is moved relative to an adjacent opaque line on the other one of the two portions in a direction substantially perpendicular to said lastmentioned line, whereby upon viewing the screen of the first portion through the screen of the second portion an interference pattern, a so-called moire pattern, arises, and a reading means is provided to optically read said interference pattern. The invention is characterized in that the screen of the first portion has a division, i.e. a number of opaque lines per length unit perpendicular to the lines, different from the division of the screen of said second portion, and the reading means is so designed and positioned in relation to the screens, that the interference pattern entering a light-sensitive portion associated with the reading means is generated by the passage of substantially parallel light through the screen units.

The invention is described in the following with reference to the accompanying drawings, in which FIG. 1 in a schematic manner shows the device seen in parallel with the wheel axle, FIGS. 2 and 3 in a schematic manner show the device seen perpendicularly to the wheel axle, FIG. 4 shows the device comprising a reading means.

Figure 7:
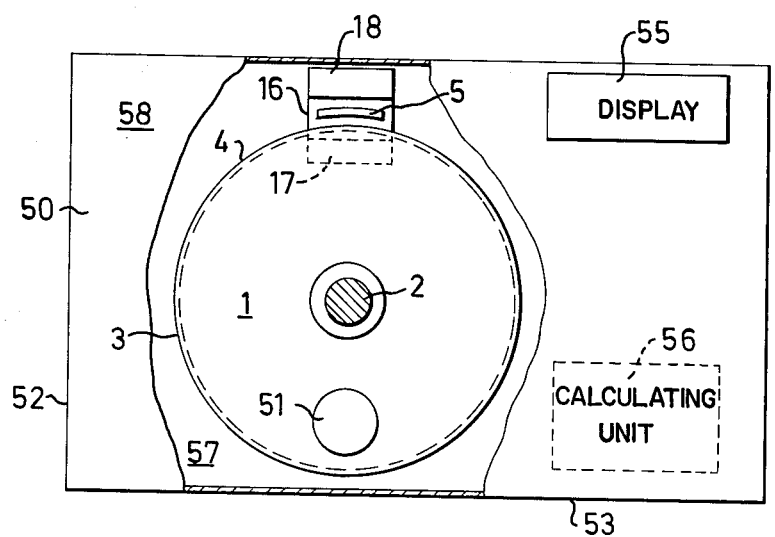

FIG. 5 is a basic electric wiring diagram according to one embodiment of the invention, FIG. 6 shows the device according to the invention arranged in connection with angular speed control, FIG. 7 shows the device according to the invention arranged for angle measurement.

In FIG. 1 a circular unit such as a wheel 1 with an axle 2 is shown.

The wheel periphery 3 has the form of a cylinder, along one edge thereof the centre of the wheel 1 is attached. The periphery 3 of the wheel 1 is provided on its outer surface with a first portion of a transmitter unit consisting of a screen 4. See also FIGS. 2 and 3. For reason of clarity only a few screen lines 8 are shown.

In parallel with and outside of the periphery 3 of the wheel 1 a second portion of the transmitter unit consisting of one or more screens 5 is located. A reading means is provided which comprises one or more light diodes 6 or the like for lighting the screens 4, 5 of the transmitter unit, and one or more phototransistors 7 or the like for recording interference patterns arising when the wheel 1, and therewith the screen 4 of the first portion is moved relative to the screen 5 of the second portion. The two portions, on which the screens 4, 5 are provided, and the periphery 3 of the wheel 1 preferably are made of a transparent plastic material. When two screens consisting of opaque lines 8 separated by transparent interspaces are moved relative to each other, interference patterns, so-called moire patterns arise upon viewing a first screen through a second screen. Depending on the mutual design of the two screens, different types of moire patterns can be caused to arise. According to the present invention, the opaque lines 8 are associated with the screen 4 of the first portion and located substantially perpendicularly to the direction of movement of the periphery 3 of the wheel 1, and the opaque lines 8 associated with the screen 5 of the second portion are located substantially in parallel with the screen lines 8 of the first portion. When the wheel 1, and therewith the first screen 4, are turned or rotate and thereby are moved perpendicularly to the screen lines 8 on the second screen 5, an interference pattern of migrating wide dark bands 9, as shown in FIG. 2, arise upon viewing the first screen 4 through the second screen 5.

According to the present invention, the screens are formed so that the screen 4 of the first portion has a division, i.e. a number of opaque lines 8 per length unit perpendicular to the lines 8, which is different from the division of the screen 5 of the second portion.

This difference in division is obtained preferably thereby, that the opaque screen lines 8 on the two portions have the same width, and that the width of the light or transparent lines in the screen 4 of the first portion is different from the width of the screen in the second portion. According to a modified embodiment, however, the width of the opaque lines 8 as well as the width of the light or transparent lines in the screen 4 of the first portion are different from the width of the screen 5 in the second portion.

The screens 4, 5, furthermore, according to the present invention are formed so that for each screen said light or transparent lines have a width smaller than that of said opaque lines. This results in a sharp interference pattern. When the light or transparent lines have the same or greater width than the opaque lines, a relatively blurred interference pattern is obtained, rendering an optic reading less accurate.

By designing the screens 4, 5 as described above, an interference pattern is obtained which, as stated, consists of migrating wide dark bands 9 when the screen 4 of the wheel 1 moves relative to the screen 5 of the second portion.

The migration direction of the wide bands 9 depends on which of the two screens 4, 5 has the densest division. FIG. 2 shows as an example an embodiment where the screen 5 of the second portion has a denser division, i.e. a greater number of opaque lines 8 per length unit perpendicular to the lines 8 than the screen 4 of the first portion. As a result thereof, the wide bands 9 migrate in a direction indicated by the arrow 10 when the wheel is turned in a direction indicated by the arrow 11.

When the screens 4, 5 of the first and second portion have a different division, the wide bands 9 will migrate a distance greater than that which is corresponded by the distance through which the periphery 3 of the wheel 1 has moved.

Thus, a ratio is obtained between the distance, through which the periphery 3 of the wheel 1 moves, and the movement of the migrating bands 9. Consequently, the movement of the periphery 3 of the wheel 1 can be read more accurately by means of the migration of the wide bands 9 than by reading directly against the periphery 3 of the wheel 1, as is the case with the aforementioned known devices.

The ratio thus obtained depends on the difference in division between the screens 4, 5 of the first and second portion. In order to obtain a high ratio, i.e. that a great number of wide bands 9 pass a point on the second screen 5 for a certain movement of the periphery of the wheel 1, the difference in division between the screens 4, 5 of the two portions must be small. When, for example, the opaque lines 8 on the screens 4, 5 of the two portions have the same width, for example 0,6 mm, and the intermediate light or transparent lines have a width of 0,5 mm in one screen and a width of 0,3 mm in the second screen, a ratio of the magnitude of about 10 times is obtained, i.e. the wide bands 9 seem to migrate over the screens 4, 5 a distance, which is 10 times longer than the distance, through which the periphery 3 is moved. This example, thus, proves that by means of the device according to the present invention a substantially higher accuracy in measuring the movement of the periphery 3 of the wheel 1 can be obtained than by measuring directly on the periphery 3 of the wheel 1.

As already mentioned, the interference pattern is read by means of one or more light diodes 6 and phototransistors 7.

In the case when only the first and second portion, respectively, consist only of one screen, one light diode 6 and one phototransistor 7 are used.

According to one embodiment, the screen 4 of the first portion on the periphery 3 of the wheel 1 is provided with transparent lines between the opaque lines 8.

The wheel 1 then is provided with a transparent periphery 3.

In that case, the light diode 6, or the light diodes when there are several screens on one or both of said portions 4, 5 of the transmitter unit, are placed between the periphery 3 of the wheel 1 and its axle, as shown in FIG. 1. The phototransistor 7, or the phototransistors when there are several screens on one or both of said portions 4, 5 of the transmitter unit, are positioned on that side of the screen 5 of the second portion which faces outward from the wheel 1, as shown in FIG. 1. The light diode 6, or the light diodes, can be arranged where the phototransistor 7, or the phototransistors, are located according to above, and vice versa. As also is apparent from FIG. 1, the screen 5 of the second portion overlaps the screen 4 of the first portion along a length substantially shorter than the periphery of the wheel 1.

The light diode 6, thus, lights through the transparent periphery 3 of the wheel 1 and the screen 4 applied thereon and through the screen 5 of the second portion, whereafter the light meets the phototransistor 7.

According to a second embodiment, the screen 4 of the first portion is provided with light lines, but not transparent ones, between the opaque lines 8, while the screen 5 of the second portion is provided with transparent lines between the opaque lines 8. The light diode 6 and the phototransistor 7 are located on that side of the screen 5 of the second portion which faces outward from the wheel 1. The light diode 6 then lights through the screen 5 of the second portion, and the light is reflected against the screen 4 of the first portion and transmitted through the screen 5 of the second portion to meet the phototransistor 7.

Upon movement of the periphery 3 of the wheel 1, thus, a number of migrating dark bands 9 will effect that the light from the light diode 6 meets the phototransistor 7 in the form of pulsating light. The phototransistor 7 converts these light pulses to electric pulses, which are amplified and processed in an electronic unit suitable for this purpose.

By arranging the screens 4, 5 of the two portions so that a high ratio of the aforesaid kind is obtained, a great number of electric pulses can be obtained from the phototransistor for a relatively small movement of the periphery 3 of the wheel 1. It also appears from the aforesaid, that so high an accuracy concerning a movement of the periphery 3 of the wheel 1 is brought about by the present device without its components having to be designed with a correspondingly high precision, as is the case with known devices where, for example, the division of the periphery of a wheel into slots has the effect that the division of the slots limits the accuracy.

By positioning the screen 4 of the first portion on a shaft, for example associated with a hydraulic motor, with a division, i.e. the distance from the centre on an opaque line to the centre of adjacent opaque lines, of 0,08 mm, and by positioning thereabove the screen 5 of the second portion with a different division, pulses with a frequency of the magnitude 1000 Hz are obtained from the phototransistor when the shaft of the hydraulic motor has a diameter of 0.3 m and rotates at 5 r.p.m. Hereby, thus, a very high accuracy concerning the number of revolutions of the shaft is obtained.

In order to obtain a very high accuracy, according to a further embodiment the screen 5 of the first or the second portion is divided into two screens 5a, 5b. The screen 5 of the second portion consists of two screens 5a, 5b with different division where the parting line 12 between the screens 5a, 5b is perpendicular to the screen lines 8 and located symmetrically on the second portion, as shown in FIG. 3.

One of the two screens 5a, 5b has a division, which is more dense than the division of the screen 4 of the first portion, and the second one of the two screens 5a, 5b has a division, which is more sparse than the division of the screen 4 of the first portion. When, for example, one screen 5a in FIG. 3 has a more dense division and the second screen 5b has a more sparse division than the screen 4 of the first portion, the wide bands 9 on one screen 5a migrate as indicated by the arrow 13, and on the second screen 5b as indicated by the arrow 14 when the periphery 3 of the wheel 1 is moved as indicated by the arrow 15. The division of the two screens 5a, 5b can have a different relationship to the division of the screen 4 of the first portion, in which case the wide bands 9 will migrate more quickly over one of the two screens 5a, 5b than over the second one.

At this embodiment a light diode 6 is provided for each of the two screens 5a, 5b, and in a corresponding manner one phototransistor 7 is provided for each of the screens 5a, 5b. The resulting two interference patterns render it possible that also the direction of the movement of the periphery 3 of the wheel 1 can be recorded. It also is evident that a higher accuracy than at the firstmentioned embodiment can be obtained, because a phase comparison between the two interference patterns can be made.

The device according to the present invention can be applied both to measuring the angular position of a wheel 1 relative to a reference direction and to measuring the angular speed of a wheel 1 at rotation.

In FIGS. 4, 5 and 6, by way of example, the device according to the present invention is shown applied to measuring both angular position and angular speed. In FIG. 4 a wheel 1 with an axle 2 is shown. On the periphery 3 of the wheel 1 the screen 4 of the first portion is provided, and the screen 5 of the second portion is provided adjacent the wheel periphery. A measuring fork 16 of U-shape is positioned so that a first leg 17 is located between the periphery 3 of the wheel 1 and the axle 2 near the periphery, and a second leg 18 is located outside the periphery of the wheel 1. The screen 5 of the second portion is placed between the second leg 18 and the wheel periphery 3. In FIG. 4 the screen 5 of the second portion is shown attached to the second leg 18 of the measuring fork 16. The first leg of the measuring fork 16 houses a light diode 6 for throwing light through the screen 4 on the wheel periphery and the screen 5 of the second portion against a phototransistor 7, which is housed in the second leg 18 of the measuring fork 16. Upon rotation or turning of the wheel 1, thus, the aforedescribed interference patterns will have the effect that the phototransistor 7 receives pulses of light with a frequency corresponding by the passage of the light and dark portions of the interference pattern between the light diode 6 and the phototransistor 7. Said pulses are a direct measure of the rotation or angular speed of the wheel 1.

In FIG. 5 an example of an electric wiring diagram for the generation of electric pulses corresponding to the aforementioned light pulses is shown. The light diode 6 and the amplifier 19 are fed with a voltage applied over the poles of the input 30. The light 20 emitted by the light diode 6 passes in the manner described above the first and second screens 4, 5 of the transmitter unit and meets the phototransistor 7. The resulting signal is amplified in three amplifier steps, each including a transistor 21, 22, 28. The capacitor 27 is a feedback capacitor.

The signal thus obtained is amplitude limited by an amplitude limiter 32 consisting of a Zener diode 29 connected in parallel over the output. The output signal is taken out via poles of the output 31.

FIG. 6 shows a block diagram where the device according to the invention is intended to be used for controlling the number of revolutions per unit of time, or the speed of an electric motor.

The transmitter unit comprises at this embodiment a disc 40 or a circle sector of a disc, which is stationary mounted, and a disc 41 mounted on the shaft 43 of the motor 42. The screen 4 of the first portion of the transmitter unit is located on one side of the disc 41 as a band 44 near the periphery of the disc. The screen 5 of the second portion of the transmitter unit is located in a corresponding manner on the other stationary disc 40. The screen lines of the two portions 4, 5 are directed radially on the discs 40, 41 or on a circle sector of a disc 40.

A measuring fork 16, one leg 17 thereof including a light diode and one leg 18 including a phototransistor, encloses the discs 40, 41 a certain angle along their periphery. The light diode, thus, throws light from one leg of the measuring fork through the two discs 40, 41 against the phototransistor in the other leg 18 of the measuring fork 16. When the shaft 43 of the motor 42 rotates with a certain angular speed, light pulses arise in the way described above and meet the phototransistor whereby they are converted to electric pulses, which are amplified in an amplifier 19. The amplifier 19 and a subsequent amplitude limiter 32 may have a design as shown in FIG. 5. The output signal from the amplitude limiter 32 is fed to a conventional control device 33, which actuates the number of revolutions of the motor 42 with respect to a nominal value. The output signal from the amplitude limiter 32 is a series of pulses, the frequency of which is proportional to the number of revolutions of the motor. The pulse frequency is compared in the control device 33 with a nominal value, whereafter the number of revolutions of the motor is adjusted so, that the pulse frequency agrees with the nominal value.

In FIG. 7 the device according to the present invention, as an example, is shown applied to the measuring of angles. A wheel 1 is provided with a shaft 2 supported in a wall 57, which in FIG. 7 is a rear wall, and in a front wall 58, which in FIG. 7 is shown partially cut away. A measuring fork 16 is provided, comprising in one leg 17 a light diode and in its other leg 18 a phototransistor. The fork is positioned so that it encloses the periphery 3 of the wheel 1 as shown in FIG. 4. The screen 4 of the first portion of the transmitter unit is located on the periphery 3 of the wheel 1, and the screen 5 of the second portion of the transmitter unit is located between the periphery 3 of the wheel 1 and the second leg 18 of the measuring fork 16, as also shown in FIG. 4.

The wheel is provided with a weight 51 of high density close to its periphery, so that the gravity point of the wheel is offset radially from its axle 2 toward its periphery 3 in the direction to the weight 51. The two aforementioned walls 57, 58 together with intermediate walls (not shown) form a housing 50, in which the wheel 1 and measuring fork 16 are enclosed.

The housing 50 further includes an amplifier unit and a counting unit, both designated by 56 in FIG. 7, for amplifying and counting the pulses generated by the screens, light diode and phototransistor.

At measuring, first the wheel 1 is locked relative to the housing 50 in the position shown in FIG. 7 by means of a locking device (not shown). Thereafter, for example, the surface 53 is positioned against a surface, the angular position of which, for example, to the horizontal plane is to be measured. The locking device is released so that the wheel 1 can rotate freely. The wheel 1 is turned so that the vertical line extends through the centre of the axle 2 and the gravity point of the wheel which preferably lies on the radius through the centre of the axle 2 and the centre of the weight 51. Upon rotation of the wheel 1 a number of electric pulses are generated in the way described above and are counted in the calculating unit 56. The number of pulses is proportional to the distance, through which the periphery 3 of the wheel 1 has been moved relative to the measuring fork 16, and thereby constitutes a measure of the angle through which the axle 2 of the wheel has been turned. This rotation corresponds to the angle, at which the surface 53 inclines to the horizontal plane. When the number of pulses have been counted, the result is converted to digital form by known technique and shown on a display 55, for example, in digital form showing the angle at which the surface 53 inclines to the horizontal plane.

At the measuring of angles in the aforedescribed way by the device according to the invention preferably screens are used, where the screen of the second portion of the transmitter unit comprises two screens 5a, 5b, as shown in FIG. 3, and the direction of rotation of the wheel 1 can be evaluated and a possible pendulation of the wheel about a position of equilibrium can be balanced by the calculating unit. The measuring fork 16 comprises two light diodes and two phototransistors, and the amplifying and calculating unit 56 includes known electronic, by means of which said evaluation can be carried out. Also at embodiments of the invention for measuring angular speed, as described above, the screen 5 of the second portion advantageously may comprise two screens 5a, 5b for being able to evaluate the direction of rotation of the wheel 1.

It is possible, as already pointed out, to achieve a much higher accuracy with respect to the measuring of a certain angle rotation by using two screens 5a, 5b in the second portion of the transmitter unit. At all embodiments referred to above, therefore, it can be suitable to use such a transmitter unit.

I claim:

1. A device for indicating the speed of a rotating wheel, comprising an open-sided cylindrical member extending from a face of said wheel, a transmitter unit including a first portion positioned along the outwardly facing periphery of the cylindrical member and a second stationary portion overlying said first portion and located adjacent to said wheel and cylindrical member and spaced radially therefrom, said first and second portions including one or more screens formed of opaque parallel lines separated by transparent areas, the opaque lines forming the screen of the first portion being arranged substantially normal to the direction of movement of the periphery of the cylindrical member and the opaque lines forming the screen of the second portion being arranged substantially parallel to the opaque lines of the first portion, the relationship and location of the two sets of lines being such that rotary movement of the cylindrical member will present a moire interference pattern when the screen of the first portion is viewed through the screen of the second portion, the number of opaque lines per unit length of the first screen being different from the number of opaque lines per unit length of the second screen, and light-sensitive reading means for detecting movement of the interference pattern and generating electrical pulses which may be counted to indicate wheel speed, said reading means including a light-emitting element for lighting the screens and a light-receiving element for sensing movement of said moire pattern, one of said elements being located within said cylindrical member between the axis of the wheel and the periphery and the other of said elements being located radially spaced outwardly from said second portion.

2. A device as claimed in claim 1 in which the transparent areas of each screen have a width of lesser dimension than the width of the opaque lines.

3. A device as claimed in claim 1 in which one of said screens includes two parts and the lined divisions on each part are dissimilar, said parts being separated by a division line, the division line being arranged generally normal to the opaque lines and disposed symmetrically on said second portion.

4. A device as claimed in claim 1 in which the opaque areas on said portions are of the same width and the width of the transparent lines on the first portion are different than the width of the transparent lines on the second portion.

5. A device as claimed in claim 1 in which the width of the opaque lines on said first portion are different than the width of the opaque lines on the second portion.

6. A device as claimed in claim 1 in which the light receiving element includes an amplifier with an output, a calculating unit connected to receive electric pulses transmitted by the amplifier, said calculating unit being adapted to convert the number of said pulses to digital data, and a display controlled by the calculating unit to show the speed of the wheel calculated by the calculating unit.

7. A device as claimed in claim 1 in which the screen of the second portion overlaps the screen of the first portion along a length substantially less than the circumference of the wheel.

8. A device for indicating the angular orientation of a wheel relative to a fixed point comprising an open-sided cylindrical member extending from a face of said wheel, a transmitter unit including a first portion positioned along the outwardly facing periphery of the cylindrical member and a second stationary portion overlying said first portion and located adjacent to said wheel and cylindrical member and spaced radially therefrom, said first and second portions including one or more screens formed of opaque parallel lines separated by transparent areas, the opaque lines forming the screen of the first portion being arranged substantially normal to the direction of movement of the periphery of the cylindrical member and the opaque lines forming the screen of the second portion being arranged substantially parallel to the opaque lines of the first portion, the relationship and location of the two sets of lines being such that rotary movement of the cylindrical member will present a moire interference pattern when the screen of the first portion is viewed through the screen of the second portion, the number of opaque lines per unit length of the first screen being different from the number of opaque lines per unit length of the second screen, and light-sensitive reading means for detecting movement of the interference pattern and generating electrical pulses which may be counted to indicate wheel rotational displacement, said reading means including a light-emitting element for lighting the screens and a light-receiving element for sensing movement of said moire pattern, one of said elements being located within said cylindrical member between the axis of the wheel and the periphery and the other of said elements being located radially spaced outwardly from said second portion, and a weight on the cylindrical member proximate to its periphery which when said wheel is rotationally displaced will seek its lowermost point causing wheel rotation, said wheel rotational displacement indicating angular orientation.

* * * * *